May 17, 1927.
B. W. BENNETT
HOSE FASTENER
Filed Oct. 21, 1924
1,629,431
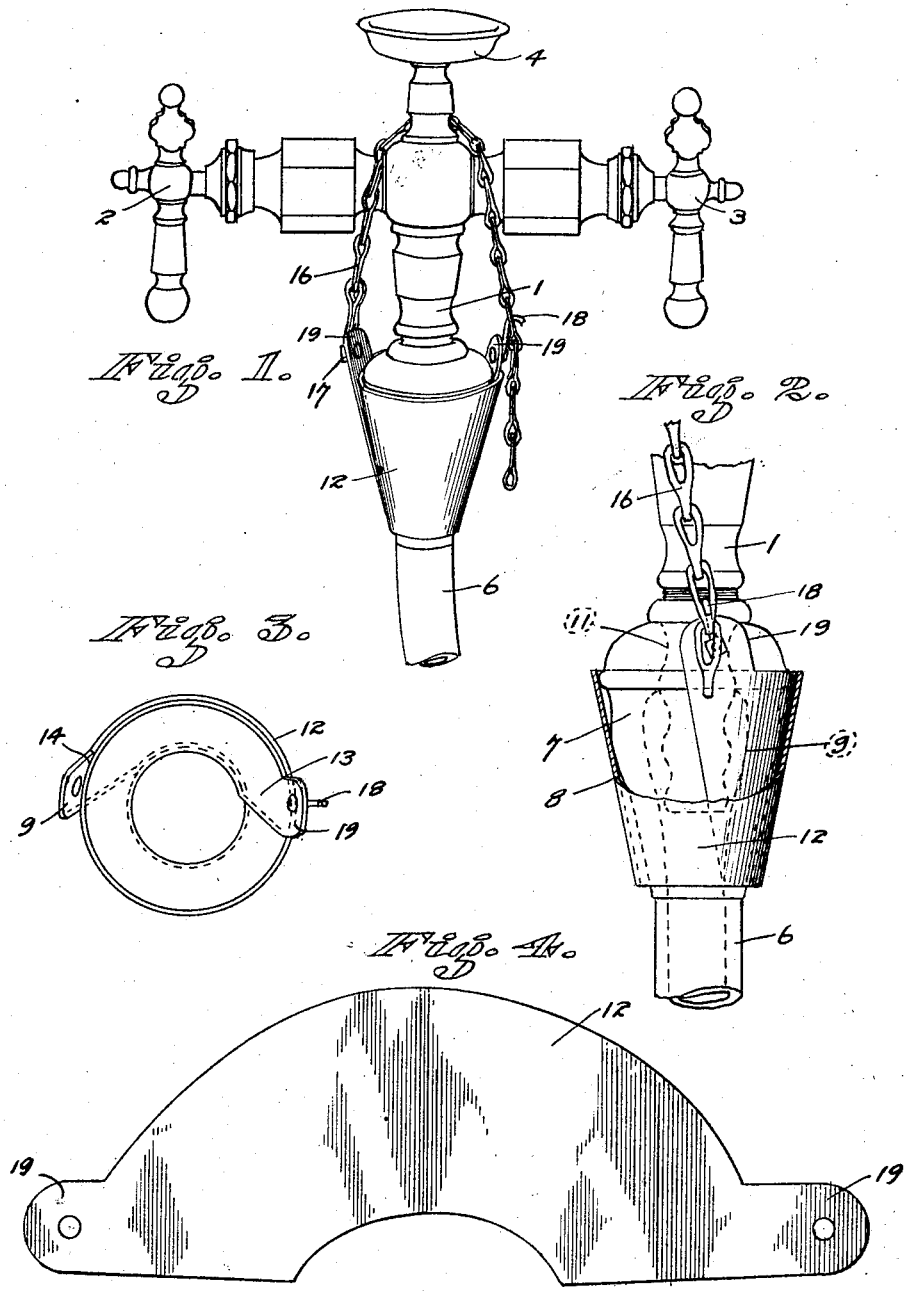
INVENTOR,
B. W. BENNETT
BY
ATTORNEYS.

Patented May 17, 1927.

1,629,431

UNITED STATES PATENT OFFICE.

BENJAMIN W. BENNETT, OF SAN FRANCISCO, CALIFORNIA.

HOSE FASTENER.

Application filed October 21, 1924. Serial No. 744,990.

The present invention relates to improvements in means for fastening a hose to a faucet, and is particularly intended to be used in connection with units of rubber hose used for bathroom attachments, such as showers and the like. To use these attachments it is ordinarily found convenient to rely on mere frictional engagement between the end of the rubber hose and the spout of the faucet for securing the attachment, but it frequently happens, particularly where there is considerable pressure, that the hose slips off the spout. My invention is designed to prevent the slipping off of the hose and contemplates the use of a fastener which may be easily attached and has a tendency not only to hold the hose in place, but also to tighten the grip of the hose in proportion to the increase of the water pressure. Further objects and advantages of my invention will appear as the specification proceeds.

The preferred form of my invention is illustrated in the accompanying drawing, in which Figure 1 shows my attachment in place in connection with the conventional bathtub faucet.

Figure 2 shows an enlarged view of my attachment taken substantially at right angles to that of Figure 1.

Figure 3 a top plan view of my fastener taken by itself, and

Figure 4 a plan view of the blank out of which the fastener may be made.

While I have shown only the preferred form of the invention, it should be understood that various changes or modifications may be made within the scope of the claims hereto attached without departing from the spirit of the invention.

In Figure 1 is shown the regular bathtub faucet presenting a downwardly extending spout 1, two handles 2 and 3, one for hot water and one for cold water, and a cup 4 on top of the faucet adapted to have soap placed thereon. The rubber hose or tube 6 terminates in a bead portion 7 of increasing cross-section so as to present a substantial conical face 8 externally. Internally the bead is formed with a core 9 slightly larger than the hole in the tube and narrowed near the top, as shown at 11, for frictional engagement with the spout 1. When the bead is slipped on the spout the frictional engagement between the bead and the spout is ordinarily relied on for holding the bead in place, but it frequently happens, particularly if the pressure of the water is increased by opening the faucet full force, that the bead is slipped off. To prevent this I provide my fastener 12 comprising a sheet of metal cut so as to form a cone when folded around the bead with overlapping edges 13 and 14. The extremities of these overlapping edges are provided with means allowing the same to be secured to the body of the faucet. For this purpose I provide a chain 16, one end of which is secured to one of the overlapping edges by means of a small bolt 17, while any of the links of the other end are adapted for engagement with a hook 18 secured in any suitable manner to the other extremity of the fastener. The latter extremities may be made with projections 19 facilitating the fastening of the chain.

To use my fastener, the same is placed around the bead 7 whereupon the bead is engaged with the spout of the faucet. The chain 16 fastened to one extremity of the fastener is then guided around the neck of the faucet and its other end fastened to the hook 18. Now when the faucet is turned on and the pressure develops a tendency to force the bead off of the spout, the chain 16 pulling on the two extremities of the fastener tightens the latter upon the bead and thereby effects a firmer engagement between the bead and the spout, preventing the bead from slipping off. Thus the firmness of engagement is enhanced in proportion to the increase in pressure.

I claim:

In combination, a hose terminating in a bead of increasing cross-section adapted to be slipped over the spout of a faucet, a sheet adapted to be folded around the bead so as to form a cone with overlapping edges and means for securing the near extremities of the edges to the body of the faucet causing the cone to contract and to be tightened upon the spout when the bead tends to recede, said sheet adapted to be unfolded from the bead when said securing means is released from said sheet.

BENJAMIN W. BENNETT.